Oct. 22, 1957 H. D. CRANE 2,810,901

MAGNETIC LOGIC SYSTEMS

Filed Feb. 29, 1956 2 Sheets-Sheet 1

INVENTOR.
HEWITT D. CRANE
BY
ATTORNEY

Oct. 22, 1957 H. D. CRANE 2,810,901

MAGNETIC LOGIC SYSTEMS

Filed Feb. 29, 1956 2 Sheets-Sheet 2

INVENTOR.
HEWITT D. CRANE
BY
Morris [signature]
ATTORNEY

United States Patent Office 2,810,901

Patented Oct. 22, 1957

2,810,901

MAGNETIC LOGIC SYSTEMS

Hewitt D. Crane, Princeton, N. J., assignor to Radio Corporation of America, a corporation of Delaware Application February 29, 1956, Serial No. 568,497

12 Claims. (Cl. 340—174)

This invention relates to magnetic systems, and particularly to improved magnetic systems which are useful in performing logical operations.

Systems for performing logical operations are used, for example, in information-handling systems which are arranged to operate on binary encoded data. For example, one such logical circuit is termed an "or" circuit; that is, one having a plurality of inputs and a single output that is activated when a signal is received on any one of its inputs. Particular types of logical "or" circuits are termed in the art "inclusive or" and "exclusive or" circuits. In the former type the output is activated when one or more of its inputs receive signals; in the latter type the output is activated when an input is received at one, and only one, of its inputs. The present invention is more nearly akin to an "exclusive or" circuit, although it also has certain of the characteristics of an "inclusive or" circuit.

In certain information-handling systems, both positive and negative pulses may be generated at the outputs of various circuits of the system. It is sometimes desirable therefore, in such systems, to provide a logical "or" circuit of simple form which can respond to either polarity input pulses. In prior magnetic "or" circuits, these circuits respond only to one polarity of input. It is also desirable to have a logical magnetic "or" circuit wherein signals appearing on one input thereof do not produce unwanted signals on another of its inputs.

Accordingly, it is among the objects of the present invention to provide a novel magnetic system.

Another object of the present invention is to provide a novel magnetic "or" circuit which is responsive to signals of either polarity received at any of its inputs for producing an output.

Another object of the present invention is to provide an improved magnetic "or" circuit wherein an input signal applied to one of its inputs does not produce undesired signals on any other of its inputs.

Another object of the present invention is to provide an improved magnetic "or" circuit wherein an input signal of either polarity does not produce any output until the output circuit is operated at any desired later time.

The above and further objects of the invention are carried out by means of a special transfluxor comprising a multi-apertured magnetic core of magnetic material characterized by having a substantially rectangular hysteresis loop, and having intersecting input apertures with orthogonal axes. A separate input winding may be provided to be wound through each different input aperture. Preferably the input windings through any pair of intersecting apertures are so wound that changes of flux produced by signals appearing on any one input winding induce cancelling voltages on any other input winding under certain conditions. An input signal of either polarity applied to an input winding changes flux along a portion of a path in the material about an output aperture of the transfluxor such that the flux along that path is in the same sense. An interrogation signal applied to an interrogation winding linked to the path about the output aperture does, or does not, produce a flux reversal about that path depending upon whether or not a signal has been received previously on any one of the input windings. Any flux reversal along the path about the output aperture induces an output in an output winding linked to the output path.

The invention will be more fully understood from the following description when read in connection with the accompanying drawing wherein:

Fig. 1 is a schematic diagram of a three-apertured transfluxor an understanding of the operation of which aids in an understanding of the present invention;

Figs. 1*a*, 1*b*, and 1*c* are schematic diagrams, in cross-section, illustrating flux configurations of the transfluxor of Fig. 1 for various applied signals;

Figure 1:
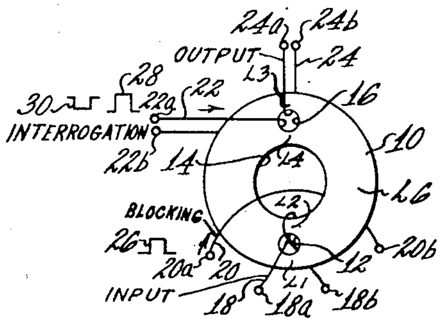
Figure 2:
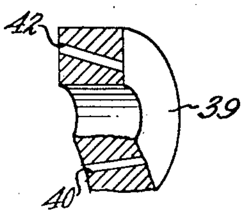
Figs. 2 and 3 are schematic diagrams of three-apertured transfluxors of the kind illustrated in Fig. 1, but illustrating different geometries of location of the respective apertures thereof.
Figure 3:
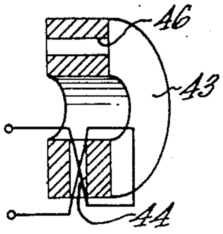

The following description of the Figs. 1–3 is given preliminary to a detailed explanation of the invention and as an aid to better understanding the invention.

The transfluxor 10 of Fig. 1 has, for example, an input aperture 12, a blocking aperture 14, and an output aperture 16. The legs $L_1$ and $L_2$ respectively are located between the inside wall of the input aperture 12 and the periphery of the disc, and the inside walls of the input aperture 12 and the blocking aperture 14. The minimum cross-sectional areas of the legs $L_1$ and $L_2$ are equal to each other. The legs $L_3$ and $L_4$ are individually adjacent the output aperture 16. The legs $L_1$, $L_2$, $L_3$, and $L_4$ have substantially the same cross-sectional area at their most restricted portions. The wide leg $L_6$ is located between the inside wall of the blocking aperture 14 and the periphery of the disc 10. The cross-sectional area of the leg $L_6$ at its most restricted portion is at least equal to the sum of the cross-sectional areas of the legs $L_1$ and $L_2$ or $L_3$ and $L_4$ at their most restricted portions.

An input winding 18 is linked, in "figure eight" configuration through the input and the blocking apertures 12 and 14. Beginning at one terminal **18*a* of the input winding 18, this winding 18 is brought across the top of the transfluxor, then downwardly through the input aperture 12, then along the bottom of the transfluxor and upwardly through the blocking aperture 14, then back across the top surface of the transfluxor and again downwardly through the input aperture 12, and then across the bottom surface of the transfluxor to the other terminal 18*b* of the input winding 18. A different number of turns of the winding 18 may be linked to each of the legs $L_2$ and $L_3$, if desired. A blocking winding 20 is linked through the blocking aperture 14. An interrogation winding 22 and an output winding 24 are each linked through the output aperture 16 of the transfluxor 10. For convenience of drawing, each of the windings of the transfluxor 10** are shown as single-turn windings. It is understood, however, that multi-turn windings may be used, if desired.

Figure 1A:
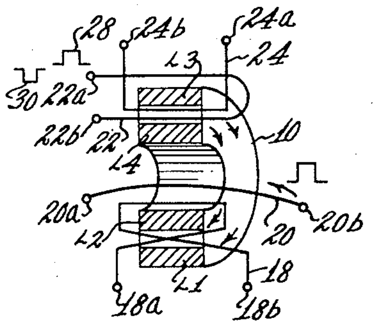

A transfluxor device is described in an article by Jan A. Rajchman and Arthur W. Lo, entitled "The Transfluxor—A Magnetic Gate with Stored Variable Setting," published in the RCA Review for June, 1955, vol. XVI, No. 2, pp. 303–311. The device of Fig. 1 of the present invention is a special form of a transfluxor. In the device of Fig. 1, a blocking pulse 26 of one polarity applied to the terminal 20*a* of the blocking winding 20 produces the flux orientation in the legs $L_1$—$L_6$, as illustrated by the arrows of Fig. 1*a*. In the blocked condition a negative interrogation pulse 30, applied to the terminal 22*a* of the interrogation winding 22, does not produce any substantial flux change about the output aperture 16 because the leg $L_4$ is already saturated with flux in the sense in which the interrogation pulse 30 tends to induce flux. Similarly, a positive interrogation pulse 28 of the polarity opposite that of the interrogation pulse 30 does not produce any substantial flux change about the output aperture 16 because the leg $L_3$ is already saturated with flux in the sense which the interrogation pulse 28 tends to induce flux. Repeated applications of pairs of interrogation pulses 30 and 28 do not produce any output signal in the output winding 24 when the transfluxor is in a blocked condition.

Figure 1B:
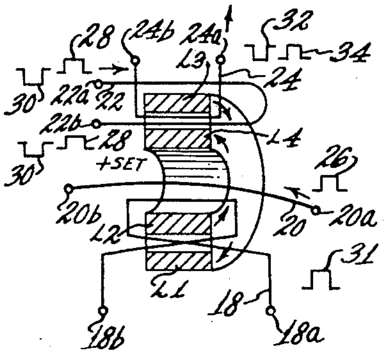

Application of a positive input pulse 31 (termed a positive set pulse) to the terminal 18*a* of the setting winding 18 induces a flux reversal in the path about the blocking aperture 14, including the legs $L_2$ and $L_4$, from the blocked sense to an opposite sense, a set sense. In what follows, both for the device of Fig. 1 and the other devices herein described, the exact nature of the flux flow is uncertain. However, a satisfactory explanation of the operation of the device may be based on the flux flow as described. The flux configuration in the transfluxor 10 after the positive set pulse 31 is probably as indicated by the arrows of Fig. 1*b*. Note that the flux is oriented in the legs $L_3$ and $L_4$ in the same one sense with respect to (that is, about) the output aperture 16. Accordingly, a negative interrogation pulse 30 applied to the terminal 22*a* of the winding 22 produces a flux reversal along the path including the legs $L_3$ and $L_4$ from the one sense to the opposite sense. An output signal 32 is induced in the output winding 24 due to the flux reversal in the path about the output aperture 16. If the negative interrogation pulse 30 is followed by a positive interrogation pulse 28, the flux in the legs $L_3$ and $L_4$ is changed back to its initial set sense and an opposite polarity signal 34 is induced in the output winding 24. A sequence of negative and positive interrogation pulses 30 and 28 produce a sequence of negative and positive output signals 32 and 34. A second, new blocking pulse 26 returns the transfluxor 10 to the blocked condition with the flux configuration indicated in Fig. 1*a*.

Figure 1C:
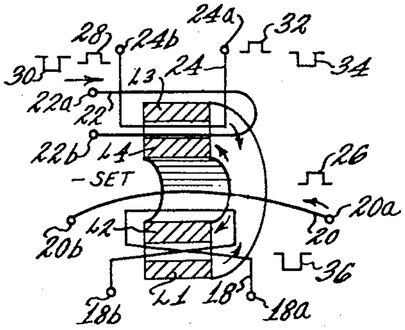

If a negative input signal 36 (termed a negative set pulse) is applied to the terminal 18*a* of the input winding 18, a flux reversal is produced in the path about both the input and the blocking apertures 12 and 14, including the legs $L_1$ and $L_4$, from the blocked sense to a set sense. The flux configuration in the transfluxor 10 following a negative set pulse is indicated in Fig. 1*c* by the arrows. Again, the flux is oriented in the legs $L_3$ and $L_4$ in the same one sense with reference to the output aperture 16. Again, pairs of negative and positive interrogation pulses 30 and 28 induce pairs of negative and positive output signals 32 and 34 in the output winding 24. Accordingly, the transfluxor 10 may be placed in a set condition by applying either positive or negative set pulses to the setting winding 18.

The input and output apertures 12 and 16 need not be located in the material with their axes parallel to each other, as shown in Fig. 1, but may have their axes located at different directions with respect to each other. For example, the input and output apertures 40 and 42 for the transfluxor 39 may have their axes skewed to each other, as shown in Fig. 2. The apertures 40, 42, however, are located such that their respective straight line axes pass through the center of gravity of the section of material through which they are taken. By so locating the apertures in a transfluxor, the amount of flux change produced by either polarity set pulse when applied to the transfluxor in a blocked condition is substantially the same. The input and output apertures also may be located with their axes orthogonal to each other, as shown in Fig. 3, for the input and output apertures 44 and 46 respectively of the transfluxor 43. The operation of the transfluxors of Figs. 2 and 3 is similar to that described for the transfluxor 10 of Fig. 1, and will be understood by those skilled in the art from the description of the operation of the transfluxor 10.

A plurality of separate input apertures can be located in the material about the blocking aperture of a transfluxor. Individual input windings may be linked through the separate input apertures. Application of a suitable input pulse to any one input winding produces a flux reversal in a path including the blocking aperture. This flux reversal operates to set the flux along the path about the output aperture of the transfluxor in the same sense as described for the transfluxor 10 of Fig. 1. A subsequent series of pairs of interrogation pulses then produces flux changes along the path about the output aperture, thereby inducing a series of output signals in the output winding of the transfluxor.

However, when a plurality of input apertures are located about the blocking aperture and the input windings are linked in "figure eight" fashion, there is interaction between the separate inputs because a flux change in the path about the blocking aperture induces a voltage across the terminals of the input windings.

According to the invention, a magnetic "or" circuit may be provided by locating two separate input apertures with their axes intersecting. For example, the axes of the input apertures may be at right-angles to each other so that equal cross-sectional areas are provided for the legs adjacent the input apertures, as shown for the transfluxor 50 of Fig. 4. The transfluxor 50 has, for example, a blocking aperture 52 and a first input aperture 56 having their respective axes parallel to one another. A second input aperture 58 is located with its axis orthogonal to that of the first input aperture 56. Note that the second input aperture 58 is terminated at the blocking aperture 52 and, accordingly, the first and second input apertures 56 and 58 intersect each other, but neither intersects the blocking aperture 52. A cross-sectional view of the transfluxor 50 through the line 5—5 is shown in Fig. 5.

A first input winding 60 is linked, in "figure eight" fashion, through the blocking aperture 52 and the first input aperture 56; and a second input winding 62 is linked, in "figure eight" fashion, through the blocking aperture 52 and the second input aperture 58. Beginning at one terminal, the terminal 60*a* the first input winding 60 is passed across the top surface of the transfluxor 50, then downwardly through the first input aperture 56, then across the bottom surface of the transfluxor 50, and around its edge and across its top surface, and again downwardly through the first input aperture 56, then across the bottom of the transfluxor 50 and upwardly through the blocking aperture 52, and then back to its other terminal 60*b*. Beginning with the terminal 62*a*, the second input winding 62 is passed across the top surface of the transfluxor 50, then downwardly through the blocking aperture 52 and through the second input aperture 58, then around the lower edge of the transfluxor 50 and across its bottom surface, then upwardly through the blocking aperture 52, then through the second input aperture 58, and then back to its other terminal 62*b*. The interrogation winding 63 and the output winding 65 are each wound through the output aperture 54. A blocking winding 59 is wound through the blocking aperture 54.

Figure 6:
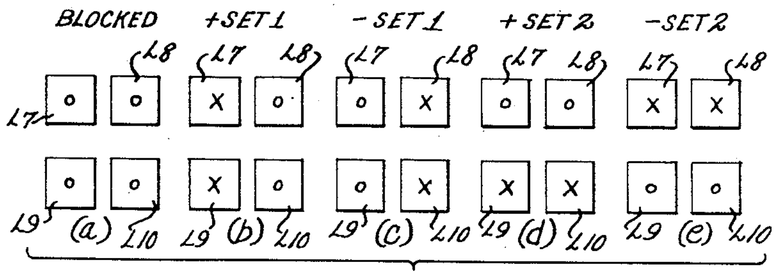

In operation a blocking pulse 64, applied to the terminal 59*a* of the blocking winding 59, orients the flux in the same sense, with respect to the blocking aperture 52, in each of the legs $L_7$—$L_{10}$. The respective legs $L_7$—$L_{10}$ are located adjacent the first and second input apertures 56 and 58, and the legs $L_{11}$ and $L_{12}$ respectively are located adjacent the output aperture 54. The minimum cross-sectional area of any of the legs $L_7$—$L_{10}$ is preferably equal to that of any other of the legs $L_7$—$L_{10}$. The cross-sectional areas of each of the legs $L_{11}$ and $L_{12}$ are equal to the sum of the cross-sectional areas of any two of the legs $L_7$—$L_{10}$. The flux orientation in the legs $L_7$—$L_{10}$, after the blocking pulse 64, is represented by the symbolic diagram of Fig. 6*a*. In Fig. 6*a* each of the rectangles represents one of the legs $L_7$—$L_{10}$. A dot placed in a rectangle indicates flux oriented in a leg in the one sense, with reference to the blocking aperture 52. The one sense may be, for example, the clockwise sense. A cross placed in a rectangle represents flux oriented in a leg in the opposite sense, the counterclockwise sense. Thus, as indicated in Fig. 6*a*, flux is oriented in the clockwise sense in each of the legs $L_7$—$L_{10}$ when the transfluxor 50 is placed in the blocked condition. The flux in the legs $L_{11}$ and $L_{12}$ adjacent the output aperture 54 is also oriented in the clockwise sense with respect to the blocking aperture 52. However, the flux in legs $L_{11}$ and $L_{12}$ is oriented in opposite sense with respect to the path about the output aperture, i. e., the flux in the leg $L_{12}$ is in the clockwise sense, and the flux in the leg $L_{11}$ is in the counterclockwise sense with respect to the output aperture 54. Thus, in the blocked condition, a series of alternating negative and positive interrogation pulses 66 and 68 do not produce any reversal of the flux along the path about the output aperture 54 because the one or the other of the legs $L_{11}$ and $L_{12}$ is already saturated with flux in the sense in which the one and the other interrogation pulses tends to change flux.

Assume, now, that the positive input pulse 70 is applied to the terminal 60*a* of the first input winding 60. This input pulse (termed, for convenience, a positive set 1 pulse) produces a flux change in the legs $L_7$ and $L_9$ on either side of the second input aperture 58 and in the leg $L_{11}$ adjacent the output aperture 54. The flux configuration in the legs $L_7$—$L_{10}$, after the positive set 1 pulse is applied, is indicated in Fig. 6*b*. No flux change is produced by the positive set 1 pulse in the legs $L_8$ and $L_{10}$ because each of these legs is already saturated in the sense of the positive set 1 pulse. The flux reversal in the legs $L_7$ and $L_9$ induce cancelling voltages in the second input winding 62 and, accordingly, no current flow is produced therein. After the positive set 1 pulse, the flux along the path about the output aperture 54 is oriented in the same sense, the clockwise sense, due to the flux reversal in the leg $L_{11}$. A sequence of interrogation pulses now causes a sequence of output signals in the output winding 65. A new blocking pulse 64 applied to the blocking winding 59 returns the transfluxor 50 to the blocked condition.

Application of a negative input pulse 72 (termed a negative set 1 pulse) to the terminal 60*a* of the first input winding 60 produces a flux reversal in the legs $L_8$ and $L_{10}$ on either side of the second input aperture 58 and in the leg $L_{11}$ adjacent the output aperture 54. The flux configuration in the legs $L_7$—$L_{10}$, after the negative set 1 pulse, is indicated in Fig. 6*c*. The flux reversals in the legs $L_8$ and $L_{10}$ induce equal and opposite cancelling voltages in the second input winding 62 and, again, no current flow is produced therein. A series of interrogation pulses applied to the interrogation winding 63 produces a series of output signals in the output winding 65. Another subsequent blocking pulse 64, applied to the blocking winding 59, returns the transfluxor to its blocked condition with the flux configuration in the legs $L_7$—$L_{10}$, as indicated in Fig. 6*a*. Note that when the transfluxor 50 is returned to the blocked condition, following either a positive set 1 or a negative set 1 pulse, no currents are produced in the second input winding 62 due to the equal and opposite flux changes in the pairs of legs $L_7$, $L_9$, or $L_8$, $L_{10}$.

Application of a positive input pulse 74 (termed a positive set 2 pulse) to the terminal 62*a* of the second input winding 62 produces a flux change in the legs $L_9$ and $L_{10}$ on either side of the first input aperture 56 and in the leg $L_{11}$ adjacent the output aperture 54. The flux configuration in the legs $L_7$—$L_{10}$ after the positive set 2 pulse is indicated in Fig. 6*d*. The flux changes in the legs $L_9$ and $L_{10}$ induce opposite-polarity cancelling voltages in the first input winding 60 and, accordingly, no current flow is produced therein. Application of a sequence of interrogation pulses to the interrogation winding 63 produces flux reversals in the path about the output aperture 54, thereby inducing a sequence of output signals in the output winding 65. A blocking pulse 64, applied after the positive set 2 pulse, returns the transfluxor 50 to the blocked condition with the flux in the legs $L_7$—$L_{10}$, as indicated in Fig. 6*a*.

Application of a negative input pulse 76 (termed a negative set 2 pulse) to the terminal 62*a* of the second input winding 62 produces a flux reversal in the legs $L_7$ and $L_8$ on either side of the first input aperture 56 and in the leg $L_{11}$ adjacent the output aperture 54. The flux configuration in the legs $L_7$—$L_{10}$, following the negative set 2 pulse, is indicated in Fig. 6*e*. The flux changes in the legs $L_7$ and $L_8$ induce equal and opposite cancelling voltages in the first input winding 60, and again no current flow is produced therein. A sequence of interrogation pulses applied to the interrogation winding 63 produces a sequence of output signals in the output winding 65. A blocking pulse applied after the negative set 2 pulse returns the transfluxor 50 to the blocked condition with the flux configuration in the legs $L_7$—$L_{10}$, as indicated in Fig. 6*a*. No current flow is produced in the first input winding 60 when the transfluxor 50 is returned to its blocked condition, after a positive set 2 or a negative set 2 pulse, because of the equal and opposite voltages induced in the first input winding 60 by the flux changes in the pairs of legs $L_7$, $L_8$, or $L_9$, $L_{10}$.

Figure 4:
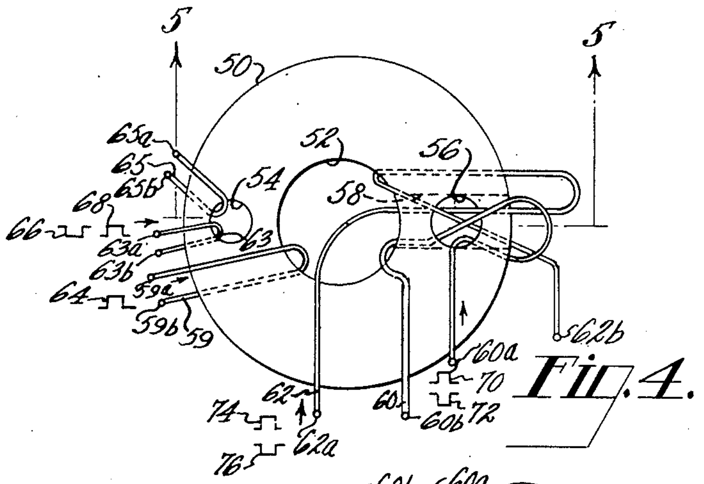
Fig. 4 is a schematic diagram of a transfluxor according to the invention.
Figure 5:
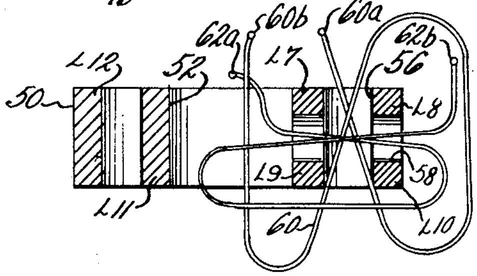
Fig. 5 is a cross-sectional view taken along the line 5—5 of the transfluxor of Fig. 4, and Figs. 6(*a*)–(*e*) are symbolic diagrams illustrating flux patterns in the material adjacent the input apertures of the transfluxor of Fig. 5 for various input signals.

The schedule of operating a device, as arranged in Fig. 4, is a block signal, then a positive or negative set 1 or set 2 signal, or neither, then a sequence of interrogation pulses, and then another block pulse which may begin a new cycle.

If two input pulses are applied one after the other to the two input windings, then a flux reversal is produced in three of the legs $L_7$—$L_{10}$. The flux change produced in the third one of the legs $L_7$—$L_{10}$ by the second of the input pulses induces a voltage across the terminals of the input winding receiving the first one of the input pulses. The second input pulse also causes a flux change in a portion of the distant leg $L_{12}$ adjacent the output aperture 54. The flux in this portion of the leg $L_{12}$ is then oriented in the sense opposite that of the previously set flux in the nearer leg $L_{11}$ and the transfluxor is partially blocked. Accordingly, when interrogation pulses are now applied to the interrogation winding 63, a smaller flux change is produced in the path about the output aperture 54 and the magnitude of the output signals are proportionally reduced. It is in this respect that the system of the present invention bears a resemblance to the "exclusive or" circuit. Thus, the magnitude of the output signal is greater, when only one input signal is received on any one input winding, than it is when two separate input pulses are applied to the two separate input windings. The same partial blocking of the transfluxor also results when two input signals are applied simultaneously to the two input windings.

If desired, the interrogation may consist of a sequence of priming and drive pulses as described in the aforementioned article. In such case a priming pulse applied to a separate priming winding (not shown), linked through the output aperture, is used to reverse the flux in the path about the output aperture from the set sense to the opposite sense. The priming may be carried out relatively slowly so as not to induce any substantial output in the output winding. A subsequent drive pulse reverses the flux along the path about the output aperture back to the set sense and induces an output in the output winding. The drive may be as large as desired without producing spurious unblocking of a transfluxor.

For convenience of the drawing, the windings of the transfluxor 50 have been shown as single-turn windings. It is understood, however, that multi-turn windings may be employed if desired. Furthermore, a transfluxor of the present invention may be an analogue device with the amount of flux change produced in a leg adjacent the output aperture being substantially proportional to amplitude of the input signal. A transfluxor analogue device is described in a copending application filed by Jan A. Rajchman on December 7, 1954, Serial No. 473,709, entitled "Magnetic Systems."

A magnetic system arranged as is the transfluxor 50 having a relatively inner aperture and three relatively outer apertures, with two of the outer apertures intersecting each other, provides an improved mean for performing a logical "or" operation wherein one of the inputs is substantially decoupled from the other of its inputs. A transfluxor 50 is changed from its blocked condition to a set condition by applying a pulse of either polarity to an input winding linked through either the first or the second intersecting input apertures. Any input pulse applied to an input winding of one input aperture causes cancelling voltages to be induced in an input winding linked through the other input aperture when the transfluxor is changed from the blocked to the set condition.

What is claimed is:

1. A device comprising a core of magnetic material having a substantially rectangular hysteresis loop, said core having a blocking aperture, an output aperture, and first and second input apertures, said first and second input apertures intersecting each other with their axes substantially at right angles to each other.

2. A magnetic device comprising a core of magnetic material having a substantially rectangular hysteresis loop, said core having three apertures therein, one of said apertures intersecting a second of said apertures and terminating at said third aperture.

3. A magnetic device comprising a core of magnetic material having a substantially rectangular hysteresis loop, said core having three apertures therein, one of said apertures intersecting a second of said apertures but not said third aperture, the radial dimension of said third aperture being greater than the radial dimensions of either of said one and said second apertures.

4. A magnetic device comprising a core of magnetic material having a substantially rectangular hysteresis loop, said core having a relatively inner aperture and three relatively outer apertures, two of said outer apertures being spaced from each other circumferentially about said inner aperture, and the third of said outer apertures intersecting one of said two outer apertures.

5. A magnetic device comprising a core of magnetic material having a substantially rectangular hysteresis loop, said core having a relatively inner aperture and a pair of relatively outer apertures therein, one of said outer apertures intersecting the other of said outer apertures.

6. A magnetic device comprising a core of magnetic material characterized by having a substantially rectangular hysteresis loop, said core having a blocking aperture, and at least first and second input apertures, said first and second input apertures intersecting each other and having their axes substantially orthogonal to each other, a blocking winding wound through said blocking aperture for receiving blocking signals of one polarity, a first input winding wound through said blocking aperture and said first input aperture for receiving input signals of either polarity, a second input winding wound through said blocking and said second input aperture for receiving input signals of either polarity, said first and second windings being arranged in a sense such that flux changes produced in said core by said blocking signals induce cancelling voltages in said input windings and flux changes produced in said core by said input signals received by one of said input windings induce cancelling voltages in the other of said input windings.

7. A magnetic device comprising a core of magnetic material characterized by having a substantially rectangular hysteresis loop, said core having three apertures therein a first and second of said apertures intersecting each other and having their axes substantially orthogonal to each other, a first winding wound in "figure-eight" fashion through said third and said first apertures, and a second winding wound in "figure-eight" fashion through said third and said second apertures.

8. A magnetic device comprising a core of magnetic material characterized by having a substantially rectangular hysteresis loop, said core having a blocking and at least first and second input apertures, said first and second input apertures having their axes substantially orthogonal to one another, first and second input windings wound in "figure-eight" fashion respectively through said blocking and said first input apertures and through said blocking and said second input apertures, and means for applying input signals of either one or the other of opposite polarities to one of said input windings, said input signals producing a flux change in one direction in a path about said blocking aperture, and said flux change inducing voltages tending to cancel each other in the other of said input windings.

9. A magnetic device comprising a core of magnetic material characterized by having a substantially rectangular hysteresis loop, said core having a blocking aperture, an output aperture, and first and second input apertures, said first and second input apertures intersecting each other and being so dimensioned that the cross sectional areas of said core in a plane including the axes of said input apertures are substantially equal.

10. A magnetic device comprising a core of magnetic material characterized by having a substantially rectangular hysteresis loop, said core having a blocking aperture and first and second input apertures, said first and second input apertures intersecting each other with their axes substantially orthogonal to each other, the radial dimension of said blocking aperture being greater than the radial dimensions of either of said first and second input apertures.

11. A magnetic device comprising a core of magnetic material characterized by having a substantially rectangular hysteresis loop, said core having a blocking aperture and first and second intersecting input apertures, and first and second input windings each wound through separate ones of said first and second input apertures and also through said blocking aperture in a sense such that any flux changes produced in said core by signals of either polarity applied to one of said input windings induce voltages tending to cancel each other in the other of said input windings.

12. A magnetic device useful as a transfluxor, said device having blocking and first and second input apertures, the axes of said blocking and said first input apertures being substantially parallel to one another and the axes of said first and second input apertures being substantially orthogonal to one another, and first and second input windings each wound through separate ones of said first and second input apertures and also through said blocking aperture in a sense such that any flux changes produced in said transfluxor by signals of either polarity applied to either one of said first and second input windings induce cancelling voltages in the other of said first and second input windings.

References Cited in the file of this patent

"A New Nondestrictive Read for Magnetic Cores" (Thorensen) 1955, Western Joint Computor Conference. August 1955, pp. 111 to 116. Fig. 3, page 113 relied on.